United States Patent [19]

Muraoka

[11] Patent Number: 5,257,108
[45] Date of Patent: Oct. 26, 1993

[54] VIDEO SIGNAL PROCESSING CIRCUIT FOR IMPROVING CONTRAST FOR AN LCD DISPLAY

[75] Inventor: Koji Muraoka, 1-17-403, Goryo 3-Chome, Daito-shi, Osaka, Japan

[73] Assignee: Koji Muraoka, Daito, Japan

[21] Appl. No.: 740,169

[22] Filed: Aug. 5, 1991

[30] Foreign Application Priority Data

Aug. 6, 1990 [JP] Japan .................................. 2-209620
Aug. 31, 1990 [JP] Japan .................................. 2-231671
Apr. 16, 1991 [JP] Japan .................................. 3-112503

[51] Int. Cl.$^5$ .............................................. H04N 5/16
[52] U.S. Cl. ...................................... 358/164; 358/32; 358/172; 358/174
[58] Field of Search ............... 358/162, 164, 171, 172, 358/174, 168, 169, 32, 34

[56] References Cited

U.S. PATENT DOCUMENTS

| 4,328,514 | 5/1982 | Nakashima et al. | 358/171 |
| 4,369,466 | 1/1983 | Matsuzaki et al. | 358/171 |
| 4,745,461 | 5/1988 | Shirai et al. | 358/32 |
| 4,811,101 | 3/1989 | Yagi | 358/172 |
| 5,003,394 | 3/1991 | Lagoni | 358/174 |
| 5,089,890 | 2/1992 | Takayama | 358/164 |

FOREIGN PATENT DOCUMENTS 0460595 12/1991 European Pat. Off.

Primary Examiner—James J. Groody
Assistant Examiner—Jeffrey S. Murrell

[57] ABSTRACT

A video signal process circuit which stretches the black level of a signal voltage for a dark picture and the white level of the signal voltage for a bright picture so as to improve visual contrast and reproduce a clear picture even when a light valve with a narrow dynamic range such as a liquid crystal projector is used.

3 Claims, 18 Drawing Sheets

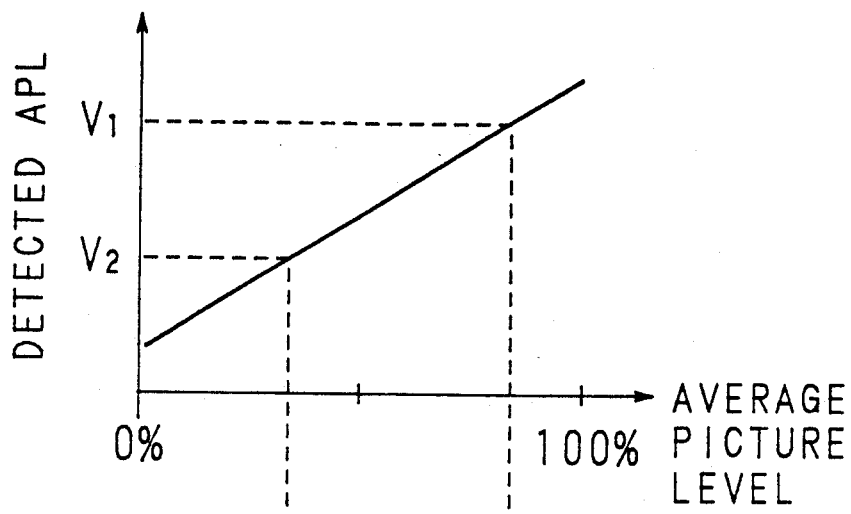
Fig. 4(a)
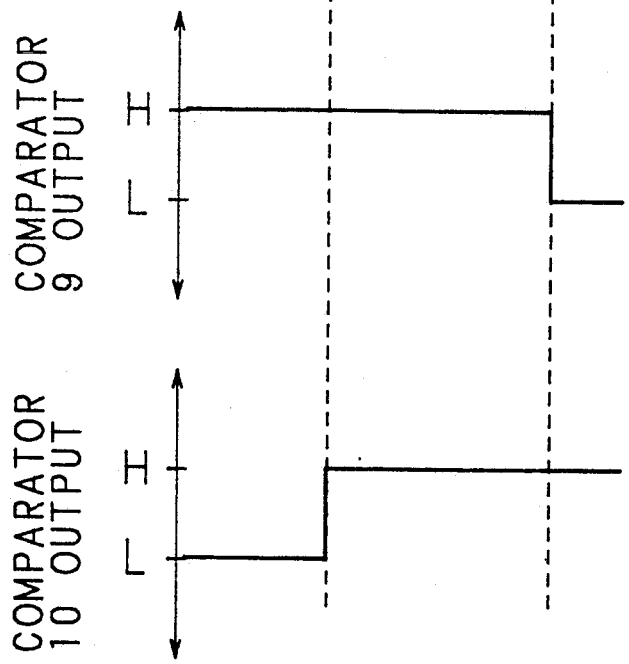
Fig. 4(b)
Fig. 4(c)

AVERAGE PICTURE
LEVEL HIGH
($APL > V_1$)

AVERAGE PICTURE
LEVEL MEDIUM
($V_2 < APL < V_1$)

AVERAGE PICTURE
LEVEL LOW
($APL > V_2$)

APL>V₁

V₂≦APL≦V₁

APL<V₂

VIDEO SIGNAL PROCESSING CIRCUIT FOR IMPROVING CONTRAST FOR AN LCD DISPLAY

BACKGROUND OF THE INVENTION

1. Field of the Invention

The present invention relates to a process circuit for video signals to a monitor using a liquid crystal display (hereinafter referred to as LCD) panel as a display, and more specifically to a process circuit for improving contrast of the LCD panel.

2. Description of the Prior Art

Visual devices generally do not have a sufficient dynamic range for reproducing a wide range of contrast in natural light. Especially, in projection monitors using an LCD panel as a light valve, a sufficient dynamic range for tone reproduction is not attained due to on/off characteristics of the panel and restriction of the peak brightness of an external light source. An example of proposed methods for improving the contrast of such monitors by nonlinear process including electrical tone correction corresponding to a screen image is disclosed in Japanese Patent Publication No. 2-6069 (1990).

Active-matrix LCD panels employing a thin film transistor (TFT) as a switching element may reproduce half tone and have high picture quality and are thus widely used as a compact liquid crystal TV display or a light valve of a projection type TV. The TFT active-matrix LCD panel is driven in normally white mode to have a maximum transmittance when a difference between the level of the electrode signal and video signal such as luminance signal becomes minimum. Accordingly, the contrast is varied with the transmittance.

The transmittance of the LCD panel is, however, not linear against inputted video signals and the characteristics are different from $\gamma$ characteristics of a CRT (cathode ray tube). FIG. 1 is a graph showing an example of transmittance characteristics in normally-white mode, with transmittance as ordinate and difference (V) between the video signal voltage and the counter electrode voltage as abscissa.

Here the maximum transmittance of the LCD panel is determined to be 100% and the minimum to be 0%. As clearly seen in FIG. 1, the transmittance abruptly decreases against the difference in a range from 3V to 5V but gradually decreases in other range. Such correction as stretching of the black level of video signals is generally performed in order to obtain the linearity of the transmittance against the video signals. FIG. 2 is a graph showing an example of conventional black-level stretching, with output of video signal as ordinate and input of video signal as abscissa. The slope of the black level is made steeper than the other part to give linearity to the black level; that is, contrast in the black level is obtained.

The dynamic range of the LCD panel is, however, still far narrower than that of the CRT and can not reproduce the tone sufficiently. The maximum/minimum ratio of the transmittance of the LCD panel is smaller than that of the actual contrast and furthermore the tone is restricted by the light amount of an external light source.

Generally, tone should be corrected for each component signal, R(red), G(green) and B(blue), which requires a large scale of circuits and complicated adjustment. On the other hand, tone correction for only a luminance signal (Y) requires a smaller circuit scale and simpler adjustment while the effect is same as the tone corrections for R,G,B component signals. But since the larger the amounts of correction for the luminance signal are, the lesser the correlation of the luminance signal with a color signal (C) becomes, such an unbalanced picture is obtained that the contrast is sufficient but the color is too light.

SUMMARY OF THE INVENTION

The present invention has been devised in order to solve the problems abovementioned.

An object of the invention is thus to provide a video signal process circuit having a relatively small-scale circuit, which obtains clearer pictures by compensating the gain of the color signal besides correcting the tone of only the luminance signal.

Another object of the invention is to provide a video signal process circuit, which corrects the transmittance-voltage characteristics of an LCD panel by stretching the black and white level of video signals corresponding to the average picture level thereof, so as to effectively utilize the dynamic range and obtain an improved visual contrast for clearer tones.

A further object of the invention is to provide a video signal process circuit, which stretches only the black level when the average picture level is low, stretches only the white level when the average picture level is high, and stretches both the black and white levels when the average picture level is medium; and gives a larger gain to color signals when either black or white levels are stretched, so as to effectively utilize a dynamic range and obtain an improved visual contrast for clearer tones.

A still further object of the invention is to provide a video signal process circuit, which attains a sufficiently large contrast even in visual devices of narrow dynamic ranges such as liquid crystal projectors.

The above and further objects and features of the invention will more fully be apparent from the following detailed description with accompanying drawings.

BRIEF DESCRIPTION OF THE DRAWINGS

FIGS. 4(a) through 4(c) are graphs showing the relationship between the detected APL(average picture level) and the outputs of comparators in the first embodiment;

DESCRIPTION OF THE PREFERRED EMBODIMENTS

The invention is explained in detail according to the drawings illustrating preferred embodiments.

Figure 3:
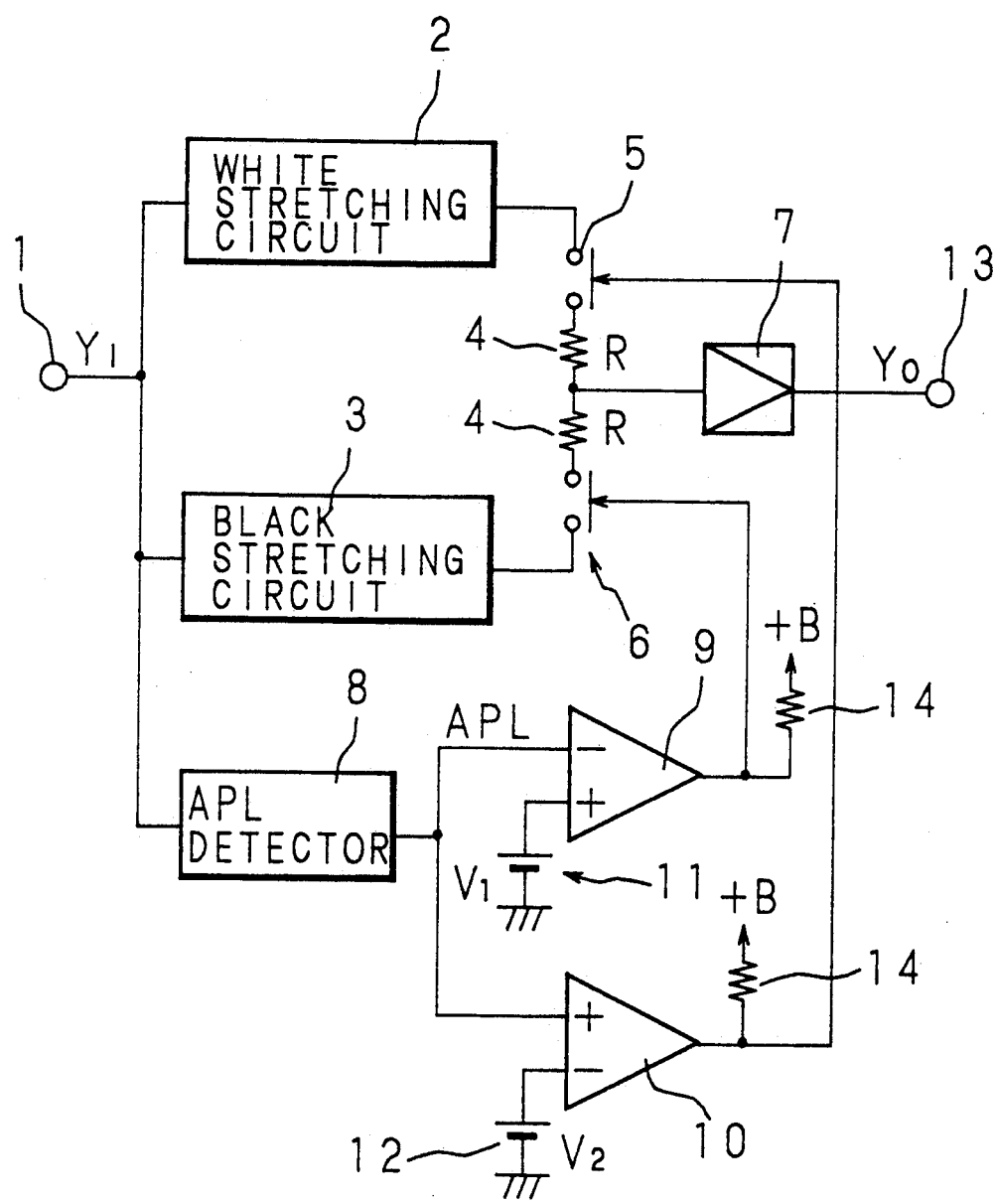
FIG. 3 is a circuit diagram illustrating a video signal process circuit according to a first embodiment of the invention.

FIG. 3 is a circuit diagram illustrating a video signal process circuit according to the invention.

As seen in FIG. 3, a luminance signal $Y_I$ inputted through an input terminal 1 is respectively applied to a white stretching circuit 2, a black stretching circuit 3, and an APL detector 8.

The white stretching circuit 2 and the black stretching circuit 3 respectively stretch the white and black levels of the luminance signal $Y_I$, and correct the linearity of the transmittance of an LCD panel. The APL detector 8 detects the average picture level of the luminance signal $Y_I$ and outputs a corresponding APL signal. An output from the white stretching circuit 2 is sent to a buffer 7 via an analog switch 5 and a composite resistance 4 while that from the black stretching circuit 3 is sent to the buffer 7 via an analog switch 6 and the resistance 4. The signal sent from the buffer 7 is outputted as a corrected luminance signal $Y_O$ from an output terminal 13. The buffer 7 is provided for transforming the impedance which lowers the impedance on the output terminal 13 side.

The detected APL outputted from the APL detector 8 is applied to a (−) input terminal of a comparator 9 and to a (+) input terminal of another comparator 10. The reference voltage $V_1$ is applied to a (+) input terminal of the comparator 9 and the other reference voltage $V_2$ to a (−) input terminal of the comparator 10, respectively (where $V_2 < V_1$).

The comparators 9 and 10 are open collector type, and a voltage (+)B is given to output terminals thereof via pull-up resistances 14, 14. Therefore, the voltage of H level output is set to be +BV.

FIG. 4(a) shows the relationship between the average picture level and the detected APL, and FIGS. 4(b) and 4(c) show the outputs of the comparators 9 and 10.

The comparator 9 outputs the H level when the detected APL is lower than the reference voltage $V_1$ ($APL < V_1$) while the comparator 10 outputs the H level when the detected APL is higher than the reference voltage $V_2$ ($APL > V_2$). The output from the comparator 9 is routed to the analog switch 6, which is closed on the H level output of the comparator 9. Similarly, the output from the comparator 10 is applied to the analog switch 5, which is closed on the H level output of the comparator 10.

Detailed processing of the video signal process circuit of the embodiment thus constructed is given below.

Figure 5A:
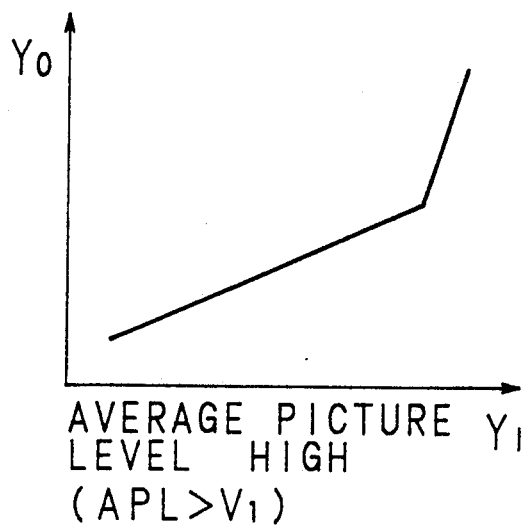
FIGS. 5(a) through 5(c) are graphs showing the input-output characteristics in the first embodiment.
Figure 5B:
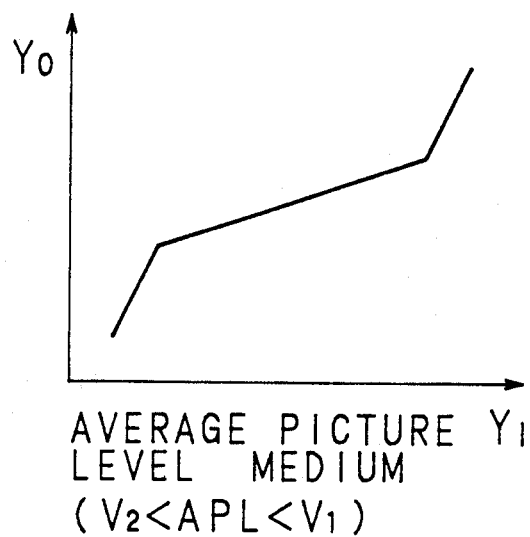
Figure 5C:
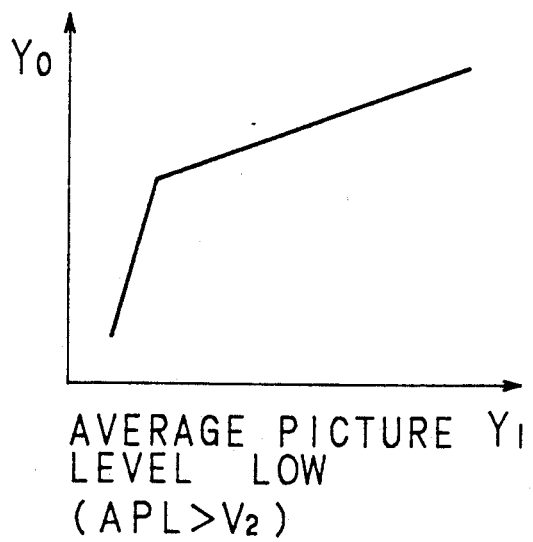

FIGS. 5(a) through 5(c) are graphs showing the relationship between the inputted luminance signal $Y_I$ plotted on the abscissa and the corrected luminance signal $Y_O$ plotted on the ordinate. FIG. 5(a) shows the input-output characteristics on the L level output of the comparator 9 and the H level output of the comparator 10, i.e., $APL > V_1$; FIG. 5(b) on the H level outputs of both the comparators 9 and 10, i.e., $V_2 < APL < V_1$; and FIG. 5(c) on the H level output of the comparator 9 and the L level output of the comparator 10, i.e., $APL < V_2$.

When the brightness of a picture is relatively high, that is, when APL is higher than $V_1$ as shown in FIG. 5(a), an output of the comparator 10 alone is set to the H level and only the analog switch 5 is closed for white stretching. When the brightness of a picture is medium, that is, when APL is higher than $V_2$ and lower than $V_1$ as shown in FIG. 5(b), outputs of the both comparators 9 and 10 are set to the H level and both the analog switches 5 and 6 are closed for white and black stretching. When the brightness of a picture is relatively low, that is, when APL is lower than $V_2$ as shown in FIG. 5(c), an output of the comparator 9 alone is set to the H level and only the analog switch 6 is closed for black stretching.

Since the white and/or black level of video signals are stretched corresponding to the average picture level, the visual contrast is greatly improved for video signals of any brightness; i.e., high or low brightness video signals having small variation of transmittance on the LCD panel, or medium brightness picture signals.

A second embodiment of the invention will be described in detail.

Figure 6:
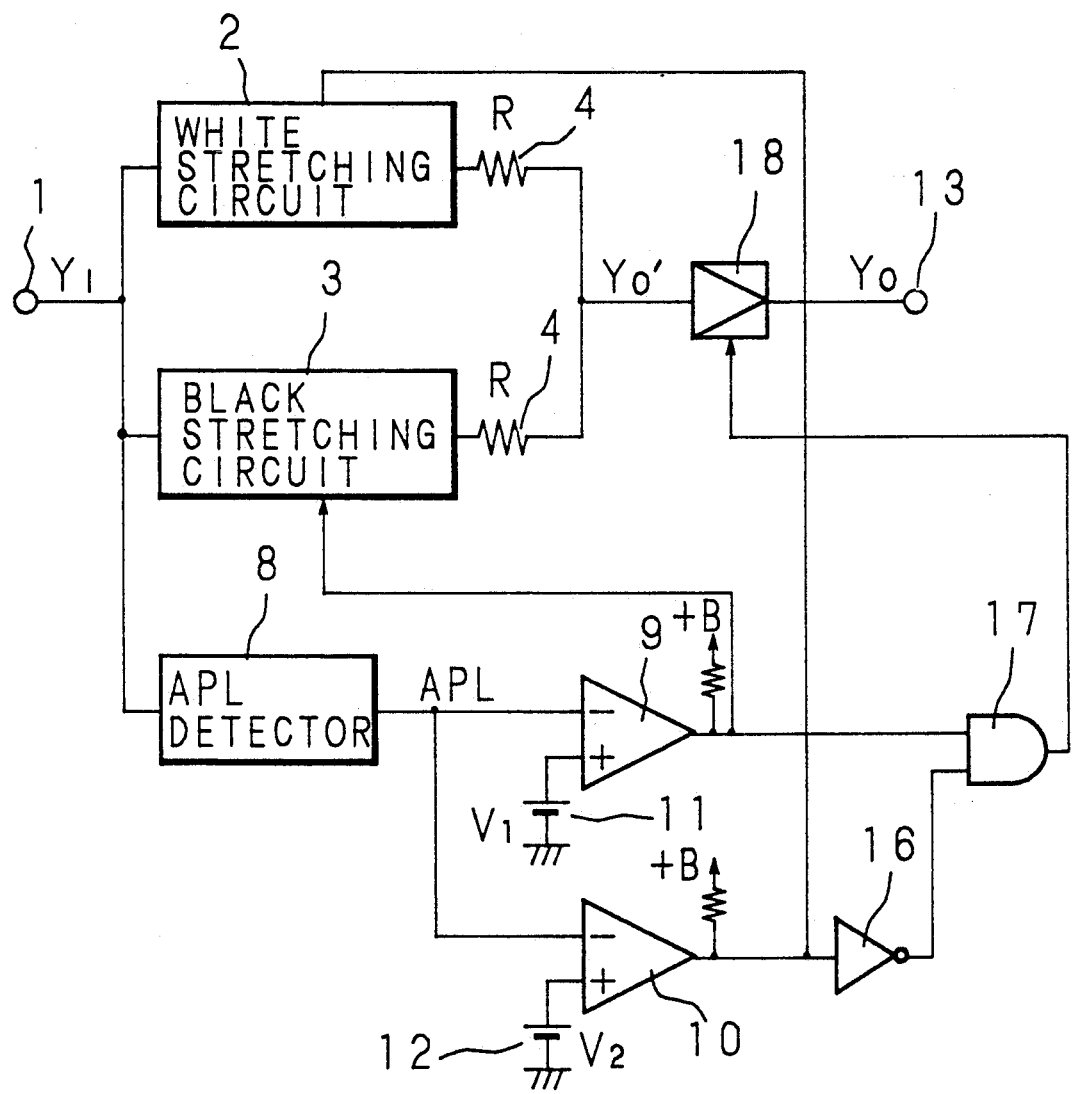
FIG. 6 is a circuit diagram illustrating a video signal process circuit according to a second embodiment of the invention.
Figure 7A:
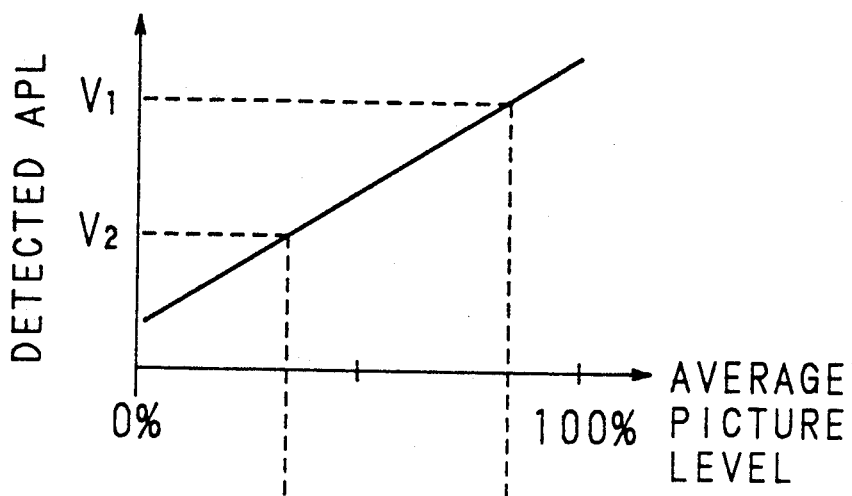
FIGS. 7(a) through 7(d) are graphs showing the relationship between the detected APL and the outputs of comparators in the second embodiment.
Figure 7B:
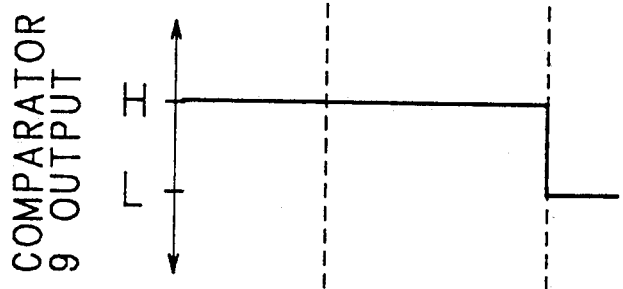
Figure 7C:
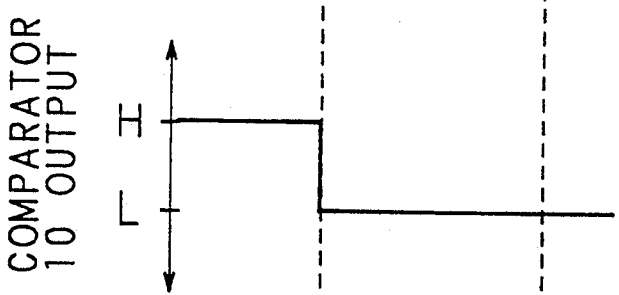
Figure 7D:
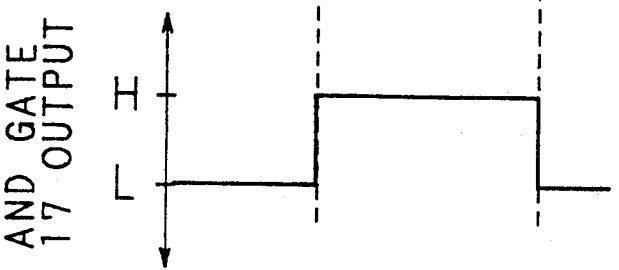

FIG. 6 is a circuit diagram illustrating a video signal process circuit according to the second embodiment of the invention.

The second embodiment does not employ analog switches as the first embodiment but a white stretching circuit 2 and black stretching circuit 3 are directly controlled by comparators 9 and 10, respectively. The second embodiment is accordingly free from flickers on the screen caused by on/off of the analog switches.

In this embodiment, different details from the first embodiment will be mainly described below.

The white stretching circuit 2 relatively stretches the white level by compressing the other part. The output of the white stretching circuit 2 is sent to a variable gain amplifier 18 via a composite resistance 4. The black stretching circuit 3 relatively stretches the black level in the same manner and the output thereof is sent to the variable gain amplifier 18 via the resistance 4.

When the white or black level is stretched as described above, the whole dynamic range, in other words, the peak-to-peak (P-P) value becomes small. Thus, the output signals are necessarily to be amplified by the variable gain amplifier 18. The detected APL from an APL detector 8 is respectively applied to (−) input terminals of the comparators 9 and 10 while the reference voltages $V_1$ and $V_2$ are respectively given to (+) input terminals of the comparators 9 and 10. The output from the comparator 9 is given to one terminal of an AND gate 17 as well as to the black stretching circuit 3 which is actuated by the H level output.

The output from the comparator 10 is given to the other terminal of the AND gate 17 via an inverter 16 as well as to the white stretching circuit 2 which is actuated by the L level output. The output of the AND gate 17 is applied to the variable gain amplifier 18, which has two gains, larger or smaller, corresponding to the level of the output, 'H' or 'L'.

FIGS. 7(a) through 7(d) are graphs showing variation of the detected APL and the outputs from the comparators 9 and 10 and the AND gate 17 against the average picture level.

The comparator 9 outputs the H level when the detected APL by the APL detector 8 is lower than the reference voltage $V_1$ while the comparator 10 outputs the H level when the detected APL is lower than the reference voltage $V_2$. The AND gate 17 outputs the H level on the H level outputted from the comparator 9 and the L level outputted from the comparator 10.

Detailed processing of the video signal process circuit of the second embodiment thus constructed is given below.

Figure 8A:
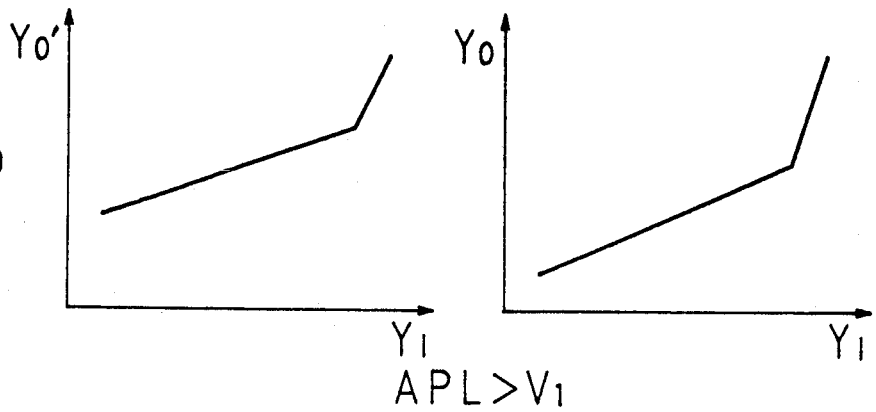
FIGS. 8(a) through 8(c) are graphs showing the input-output characteristics in the second embodiment.
Figure 8B:
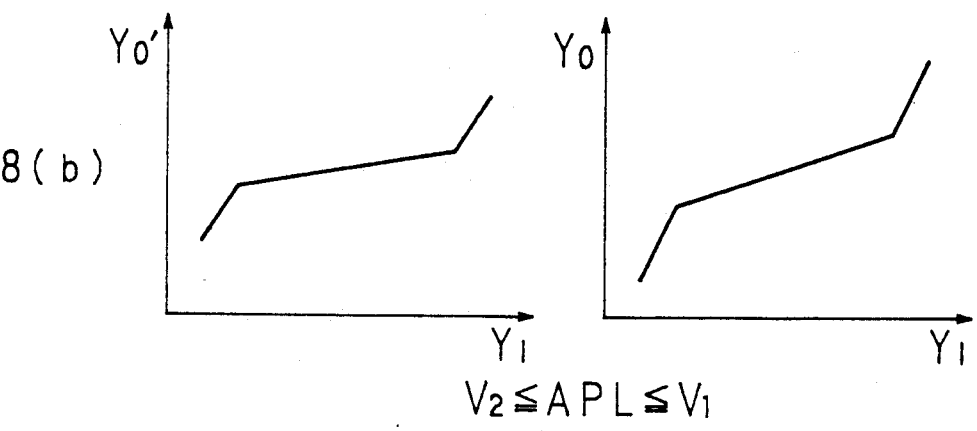
Figure 8C:
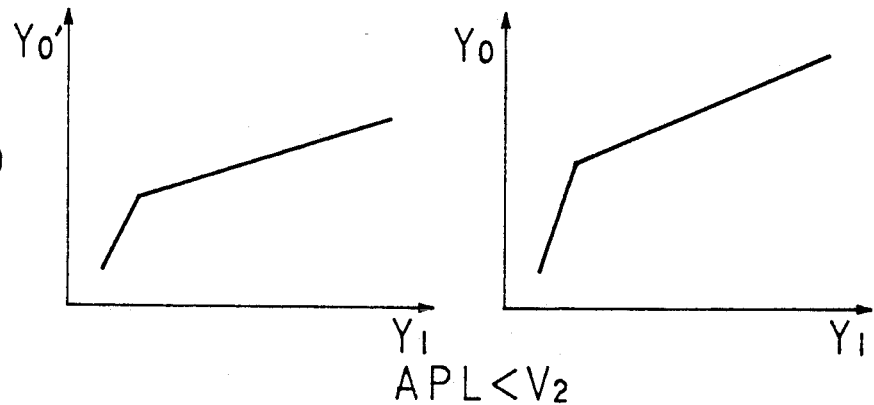

FIGS. 8(a) through 8(c) are graphs showing the relationship between an inputted luminance signal $Y_I$ plotted on the abscissa and a corrected luminance signal $Y_O$ or $Y_O'$ plotted on the ordinate. Here, $Y_O$ denotes a corrected luminance signal before amplification, and $Y_O'$ denotes the same after amplification. FIG. 8(a) shows the input-output characteristics of the case $APL > V_1$; FIG. 8(b) of the case $V_2 \leq APL \leq V_1$; and FIG. 8(c) of the case $APL < V_2$.

When a picture has high brightness, that is, the case of $APL > V_1$ as shown in FIG. 8(a), outputs of the comparators 9 and 10 are both set to the L level and only the white stretching circuit 2 is actuated for white stretching. At the time, the output from the AND gate 17 to the variable gain amplifier 18 is the L level, accordingly the smaller gain is selected to amplify the corrected luminance signal as shown on the right side of FIG. 8(a).

In the case of $V_2 \leq APL \leq V_1$ as shown in FIG. 8(b), an output of the comparator 9 is set to the H level and that of the comparator 10 is set to the L level and both the white and black stretching circuits 2 and 3 are actuated for white and black stretching. Here, the dynamic range becomes narrower or the P-P value becomes smaller than those in either white or black stretching. At the time, the output from the AND gate 17 is the H level, and accordingly the larger gain is selected in the variable gain amplifier 18.

When a picture has low brightness, that is, the case of $APL < V_2$ as shown in FIG. 8(c), outputs of the comparators 9 and 10 are set to the H level and only the black stretching circuit 3 is actuated for black stretching. The output from the AND gate 17 to the variable gain amplifier 18 is the L level, and accordingly the smaller gain is selected to amplify the corrected signal as shown on the right side of FIG. 8(c).

As described above, the dynamic range of the output characteristics is kept constant by increasing the gain of the variable gain amplifier 18 when the APL is medium. Although FIGS. 8(a) through 8(c) have equal DC levels, the actual DC levels are slightly shifted upward due to amplification, so that clamping to equalize the DC levels is thus required in the latter part of the circuit of the invention.

A third embodiment of the invention will be described in detail.

In the first and second embodiments, the black and white level of the luminance signal Y is stretched. In these embodiments, however, the stretching process is not adequately controlled corresponding to each $\gamma$ characteristics of the LCD panel, especially when they are different in respective R, G, and B signals. The third embodiment, on the contrary, executes black and white stretching for each color signal R, G, and B so as to attain tone correction corresponding to the characteristics of the LCD panel.

Figure 9:
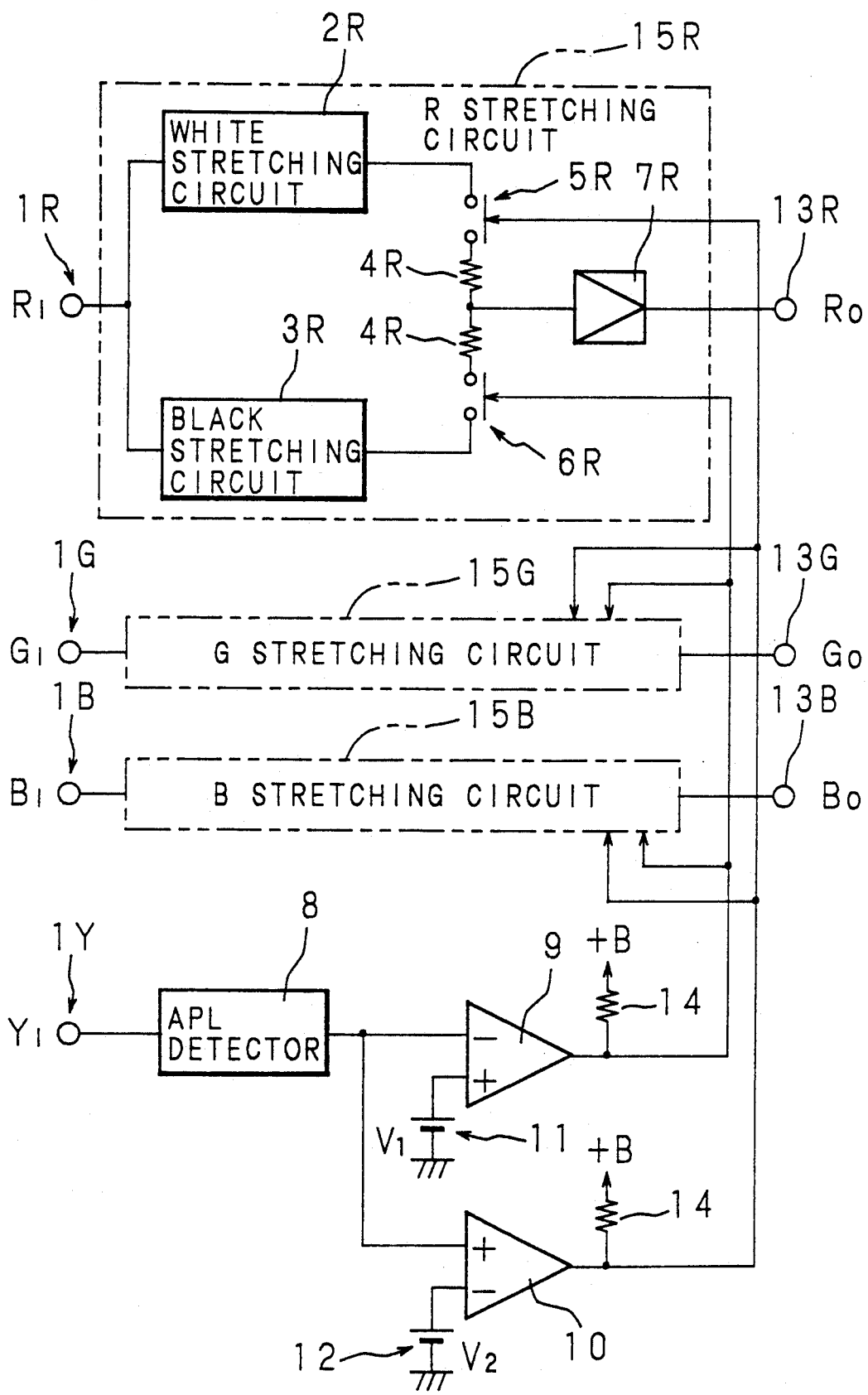
FIG. 9 is a circuit diagram illustrating a video signal process circuit according to a third embodiment of the invention.

FIG. 9 is a circuit diagram illustrating a video signal process circuit according to the third embodiment of the invention. Color signals $R_I$, $G_I$, and $B_I$ respectively inputted through color signal input terminals 1R, 1G, and 1B are applied to an R stretching circuit 15R, a G stretching circuit 15G, and a B stretching circuit 15B, respectively.

The R stretching circuit 15R includes a white stretching circuit 2R, a black stretching circuit 3R, resistances 4R, 4R, analog switches 5R and 6R, and a buffer 7R having the same structure as the first embodiment shown in FIG. 3. A corrected color signal $R_O$ is outputted from an output terminal 13R after stretching.

The G stretching circuit 15G and the B stretching circuit 15B have same construction as the R stretching circuit 15R, and corrected color signals $G_O$ and $B_O$ are respectively outputted from output terminals 13G and 13B.

An inputted luminance signal $Y_I$ is given to an APL detector 8 as the first embodiment. Comparators 9 and 10 output either H or L level signal according to the detected APL by the APL detector 8 corresponding to the average picture level. The outputs from the comparators 9 and 10 are applied to the stretching circuits 15R, 15G, and 15B for simultaneous stretching of the three color signals.

In the third embodiment, which adjusts the stretching quantities of the white stretching circuit 2 and the black stretching circuit 3 for each color, stretching is executed corresponding to the $\gamma$ characteristics of the LCD panel.

A fourth embodiment of the invention is described in detail.

Figure 10:
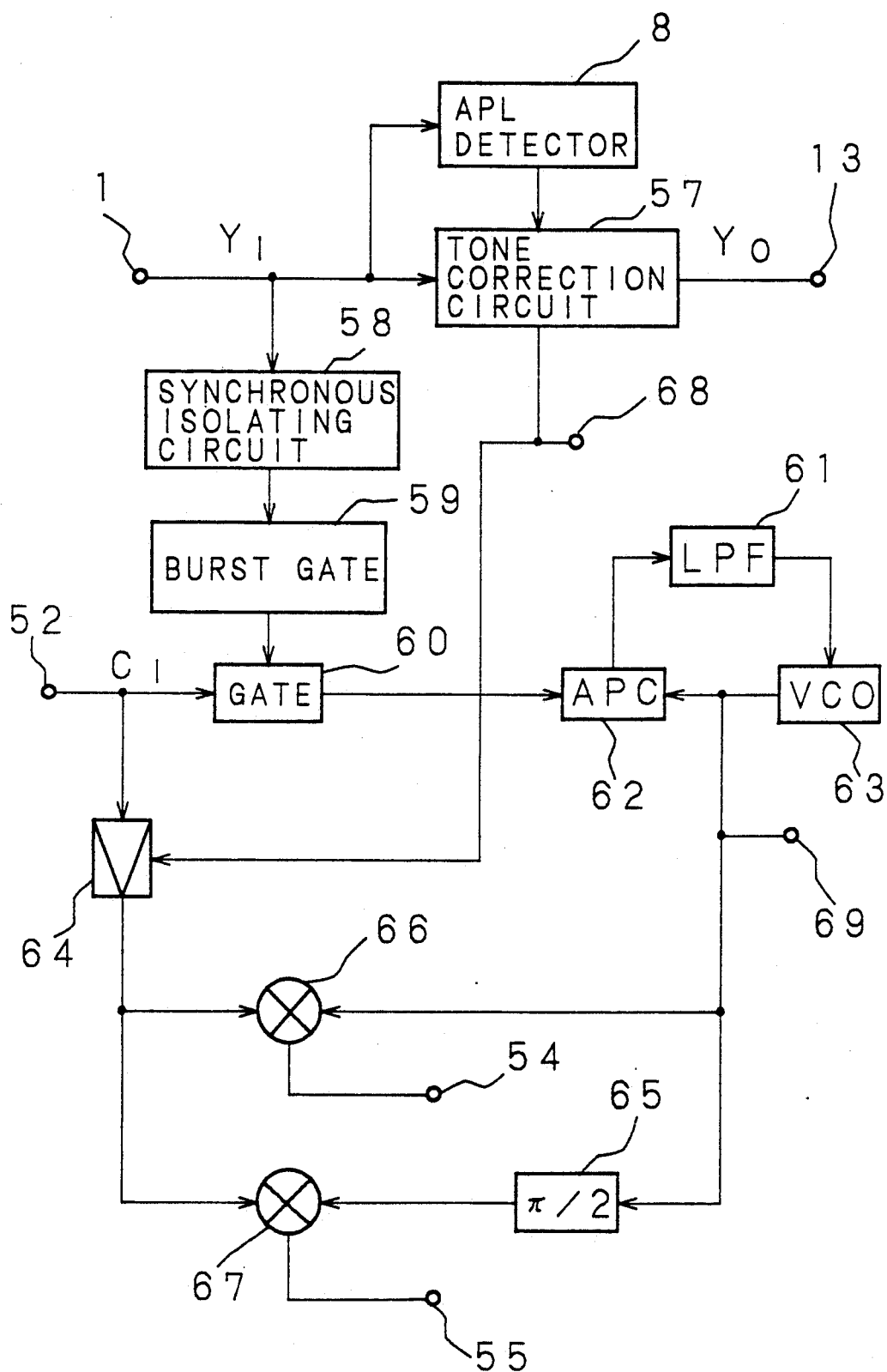
FIG. 10 is a circuit diagram illustrating a video signal process circuit according to a fourth embodiment of the invention.

FIG. 10 is a circuit diagram illustrating a video signal process circuit according to the fourth embodiment of the invention.

A luminance signal $Y_I$ inputted through an input terminal 1 is applied to an APL detector 8, a tone correction circuit 57, and a synchronous isolating circuit 58.

The APL detector 8 sends a detected average picture level (APL) of the inputted luminance signal $Y_I$ to the tone correction circuit 57.

The tone correction circuit 57 executes black and/or white stretching corresponding to the detected APL of the luminance signal $Y_I$ by the APL detector 8 so as to correct the tone of the luminance signal $Y_I$. The tone-corrected signal $Y_O$ by the tone correction circuit 57 is outputted from an output terminal 13. The tone correction circuit 57 generates a signal for controlling color gains, i.e., a control voltage to a variable gain amplifier 64.

A color signal $C_I$ inputted through a color signal input terminal 52 is applied to a gate 60 and the variable gain amplifier 64.

The synchronous isolating circuit 58 sends a sync signal isolated from the luminance signal $Y_1$ to a burst gate 59. The burst gate 59 controls open/close of the gate 60 according to the sync signal. The color signal $C_J$ synchronized with the sync signal is sent from the gate 60 to an auto phase controller (APC) 62.

A low pass filter (LPF) 61 and a voltage controlled oscillator (VCO) 63 process the color signal $C_J$ inputted to the APC 62 so as to generate a color demodulation subcarrier, which is directly applied to a phase detector 66 and also sent to another phase detector 67 via a $\pi/2$ phase shifter 65. Numeral 69 denotes an output terminal of the color demodulation subcarrier.

The variable gain amplifier 64 amplifies the color signal $C_J$, which is inputted through the input terminal 52, by the gain corresponding to the control voltage given by the tone correction circuit 57 and outputs the amplified signal to the phase detectors 66 and 67. The phase detectors 66 and 67 respectively output I and Q signals, which correspond to the phase of the color demodulation subcarrier sent from the VCO 63, through output terminals 54 and 55 thereof.

As described above, the color signal $C_J$ inputted through the input terminal 52 is amplified by the gain corresponding to the control voltage outputted from the tone correction circuit 57 to the variable gain amplifier 64 and is outputted through the output terminals 54 and 55.

Figure 11A:
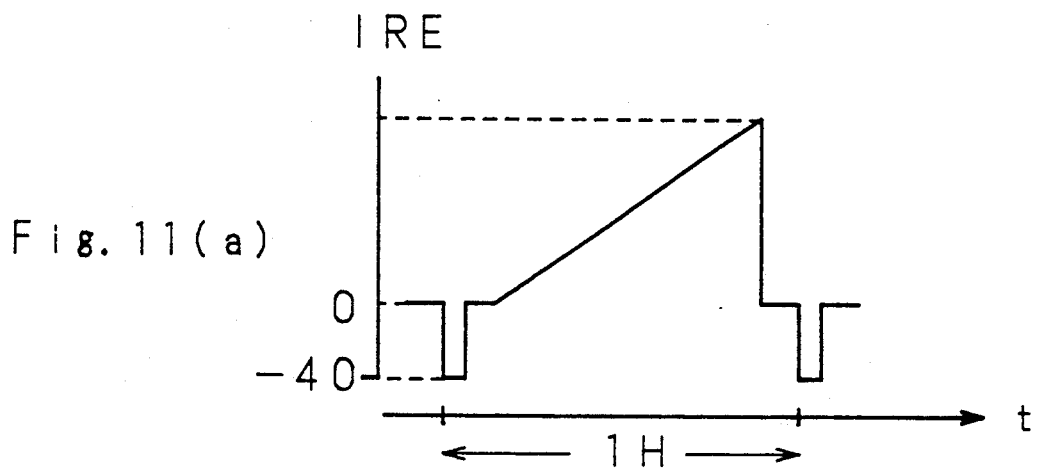
FIGS. 11(a) through 11(c) are graphs showing the input-output characteristics of luminance signals in the fourth embodiment.
Figure 11B:
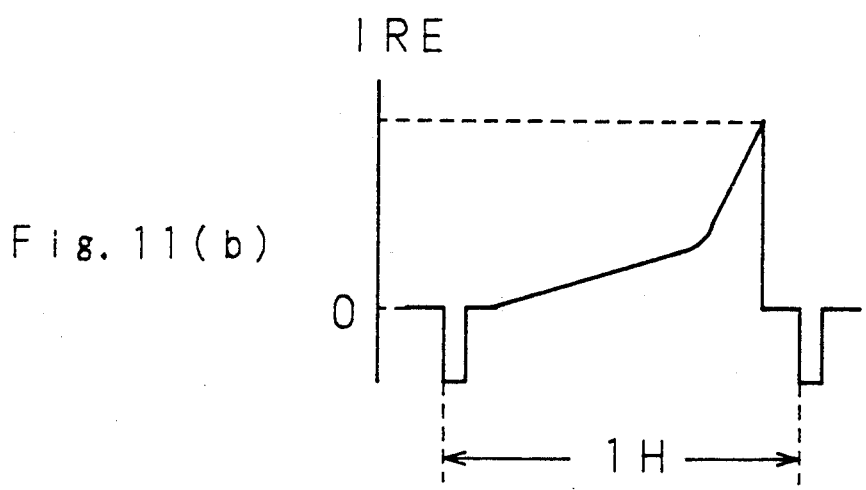
Figure 11C:
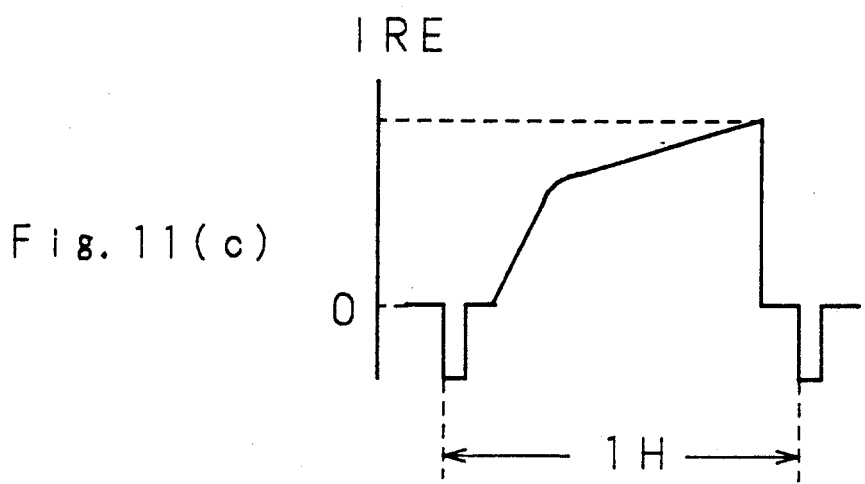

When a luminance signal Y having a waveform as shown in FIG. 11(a) is successively inputted through the input terminal 1, the average picture level detected by the APL detector 8 becomes approximately 50%. When the average picture level of the Y signal is biased, the tone thereof is corrected by the tone correction circuit 57 corresponding to the APL detected by the APL detector 8. The tone is corrected in the same manner as the above embodiments. That is, the white level is stretched as shown in FIG. 11(b) when the APL detected by the APL detector 8 is high or the picture is bright, while the black level is stretched as shown in FIG. 11(c) when the detected APL is low or the picture is dark.

Since the tone correction only by stretching the Y signal relatively lowers the color gain, the fourth embodiment having such a circuit structure shown in FIG. 10 controls the gain of the color signal.

The color signal C is inputted from the input terminal 52 and sent through the gate 60, the APC 62, the LPF 61, and the VCO 63, which generates the color demodulation subcarrier. The color demodulation subcarrier is directly given to the phase detector 66 and is also applied to the phase detector 67 via the $\pi/2$ phase shifter 65. The signal C amplified by the variable gain amplifier 64 is applied to the phase detectors 66 and 67, which respectively output I and Q signals through the output terminals 54 and 55 thereof.

The color gain is determined by controlling the gain of the variable gain amplifier 64. Accordingly, the relative lowering of the color gain due to the tone correction is compensated by varying the color gain corresponding to the tone correction of the luminance signal $Y_J$ by the tone correction circuit 57.

Figure 12:
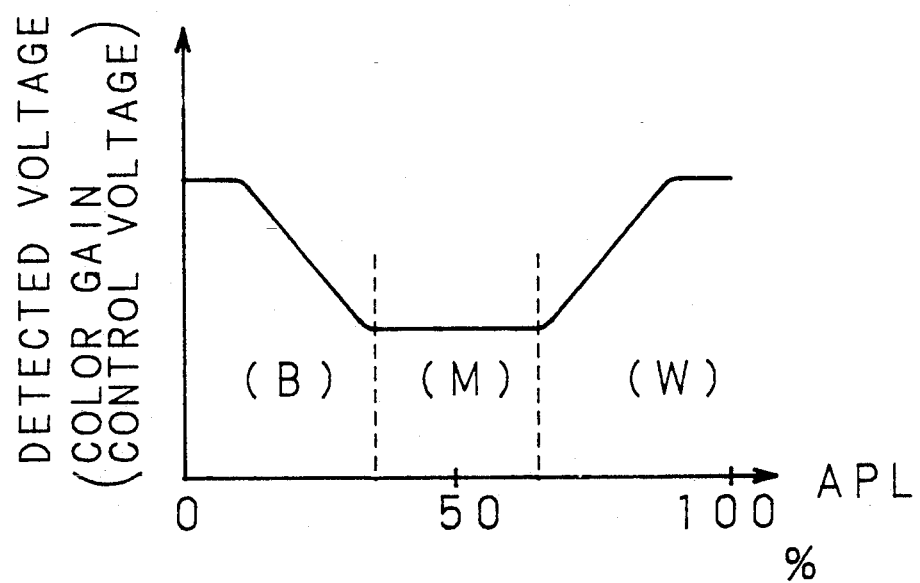
FIG. 12 is a graph showing the color gain-APL characteristics of the fourth embodiment.

FIG. 12 is a graph showing the color gain-APL characteristics in the fourth embodiment. As seen in FIG. 12, a relatively high control voltage is given from the tone correction circuit 57 to the variable gain amplifier 64 either for a region (W) of higher APL% performing the white level stretching or for a region (B) of lower APL% performing the black level stretching. On the other hand, a relatively low control voltage is given from the tone correction circuit 57 to the variable gain amplifier 64 for a region (M) of medium APL% performing both the black and white level stretchings.

Figure 13:
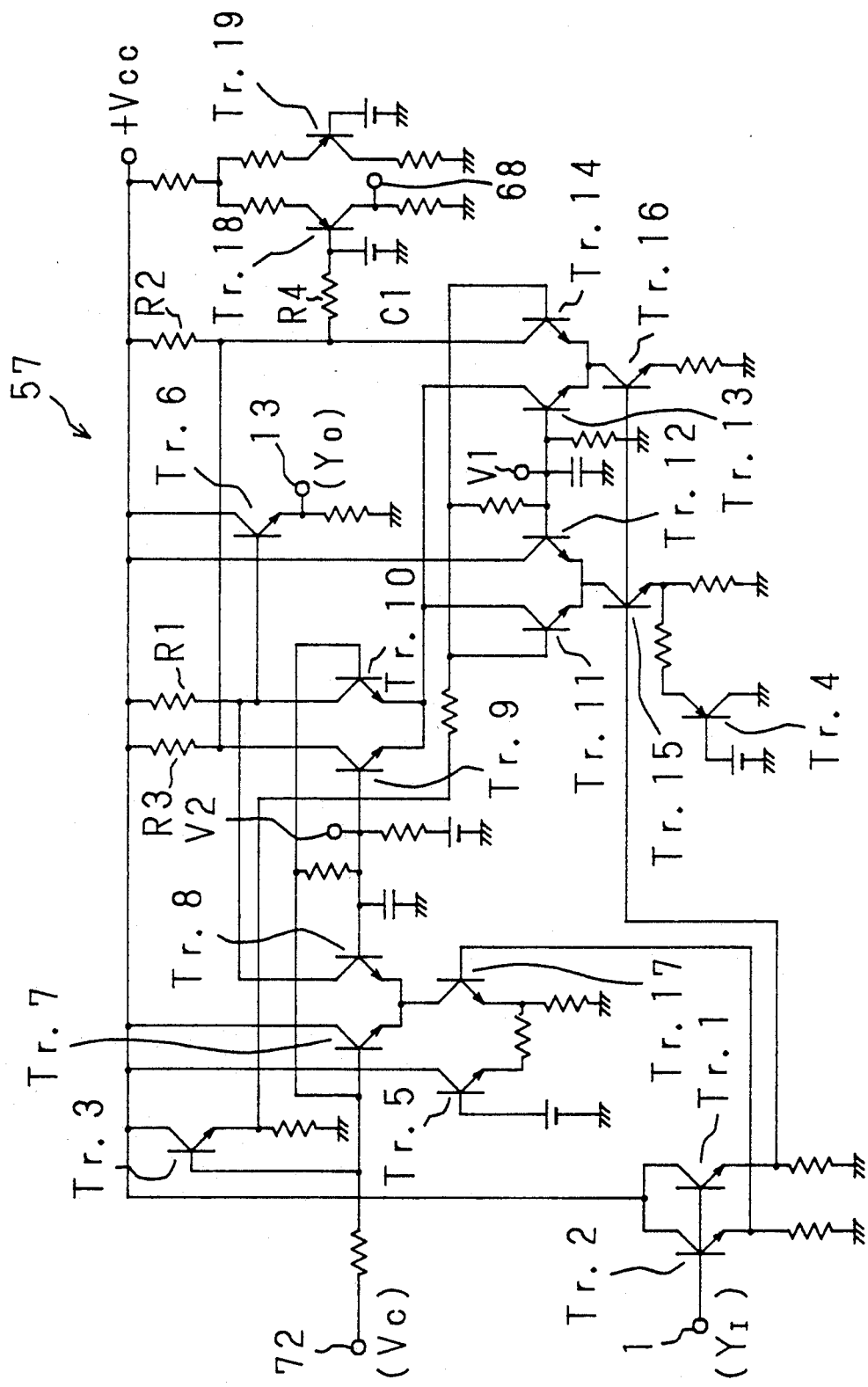
FIG. 13 is a detailed circuit diagram of a tone correction circuit of the fourth embodiment.

FIG. 13 is a detailed circuit diagram showing the tone correction circuit 57 of the fourth embodiment.

A DC restored Y signal by clamping is inputted through the input terminal 1 of negative polarity and positive synchronization.

The detected APL by the APL detector 8 is inputted as a voltage Vc through an input terminal 72. The lower the detected APL is, the higher the voltage is applied, on the contrary, the higher the detected APL is, the lower the voltage is applied.

The signal Y inputted through the input terminal 1 is applied to transistors Tr.15, Tr.16, and Tr.17 via two transistors Tr.1 and Tr.2. A black stretched Y signal is outputted from an emitter of the transistor Tr.15 and a white stretched Y signal from an emitter of the transistor Tr.17 by adequately setting the base bias of transistors Tr.4 and Tr.5.

The luminance signal $Y_J$ is finally outputted from the output terminal 13 after the potential waveform of a current running through a loading resistance R1 is detected by a transistor Tr.6. The input-output characteristics from the input terminal 1 to the output terminal 13 are varied corresponding to the black and/or white level stretching by leading the loading current to any of the transistors Tr.15, Tr.16, and Tr.17 selected by a switching circuit consisting of transistors Tr.7 through Tr.14.

Operation of the switching circuit consisting of the transistors Tr.7 through Tr.14 is determined by the relationship between a voltage Vc of the APL detected by the APL detector 8 and a base potential $V_2$ of the transistors Tr.8 and Tr.9 or a base potential $V_1$ of the transistors Tr.12 and Tr.13.

Resistances R2 and R3 of FIG. 13 detect the operation mode of the tone correction circuit 57 and output detected results to a color gain control terminal 68 as well as to the variable gain amplifier 64 for controlling the color gain.

Detailed operation of the tone correction circuit 57 shown in FIG. 13 will be described according to the magnitude of the detected APL by the APL detector 8.

(i) $Vc > V_1 > V_2$

When Vc is greater than both the potentials $V_1$ and $V_2$, that is, when the detected APL by the APL detector 8 is low, the current runs through only the transistors Tr.7, Tr.10, Tr.11, and Tr.14 of the switching circuit and the rest is OFF. Here the emitter current of the transistor Tr.15 runs through the transistors Tr.10 and Tr.11 to the loading resistance R1. Accordingly, a black-stretched luminance signal $Y_O$ is outputted from the output terminal 13.

A collector potential of the transistor Tr.14 simultaneously drops due to the current running through the loading resistance R2. The LPF consisting of a resistance R4 and condenser C1 extracts a DC component alone from the current, which is inversely amplified by a differential amplifier consisting of transistors Tr.18 and Tr.19 and outputted to the color gain control terminal 68 as well as to the variable gain amplifier 64.

The outputted voltage to the color gain control terminal 68 or the control voltage applied to the variable gain amplifier 64 increases during the black level stretching. Such operation is performed in the region (B) of FIG. 12.

(ii) $V_1 > V_c > V_2$

When Vc is between the potentials $V_1$ and $V_2$, that is, when the detected APL by the APL detector 8 is medium, the current runs through only the transistors Tr.7, Tr.10, Tr.12, and Tr.13 of the switching circuit and the rest is OFF. Here the emitter current of the transistor Tr.16 runs through the transistors Tr.10 and Tr.13 to the loading resistance R1. Accordingly, a non-stretched luminance signal $Y_O$ is outputted from the output terminal 13.

Since the current does not run through either the transistor Tr.9 or Tr.14, the voltage drop due to the loading resistances R2 and R3 does not occur. Accordingly, the voltage of the inverse output to the color gain control terminal 68 as well as to the variable gain amplifier 64 becomes relatively low. Such operation is performed in the region (M) of FIG. 12.

(iii) $V_1 > V_2 > V_c$

When Vc is lower than both the potentials $V_1$ and $V_2$, that is, when the detected APL by the APL detector 8 is high, the current runs through only the transistors Tr.8, Tr.9, Tr.12, and Tr.13 of the switching circuit and the rest is OFF. Here the emitter current of the transistor Tr.17 runs through the transistors Tr.8 to the loading resistance R1. Accordingly, a white-stretched luminance signal $Y_O$ is outputted from the output terminal 13.

A collector potential of the transistor Tr.9 simultaneously drops due to the current running through the loading resistance R3. The LPF consisting of the resistance R4 and condenser C1 extracts a DC component from the current, which is inversely amplified by a differential amplifier consisting of the transistors Tr.18 and Tr.19 and outputted to the color gain control terminal 68.

The outputted voltage to the color gain control terminal 68 or the control voltage to the variable gain amplifier 64 increases during the white level stretching. Such operation is performed in the region (W) of FIG. 12.

The corresponding degree of the color gain to the detected APL may be set freely within a considerably wide range according to the resistances of the loading resistances R2 and R3 and to the gain of the differential amplifier consisting of the transistors Tr.18 and Tr.19.

As described above, the fourth embodiment gives the control voltage of the color gain corresponding to the APL detected by the APL detector 8.

Figure 14:
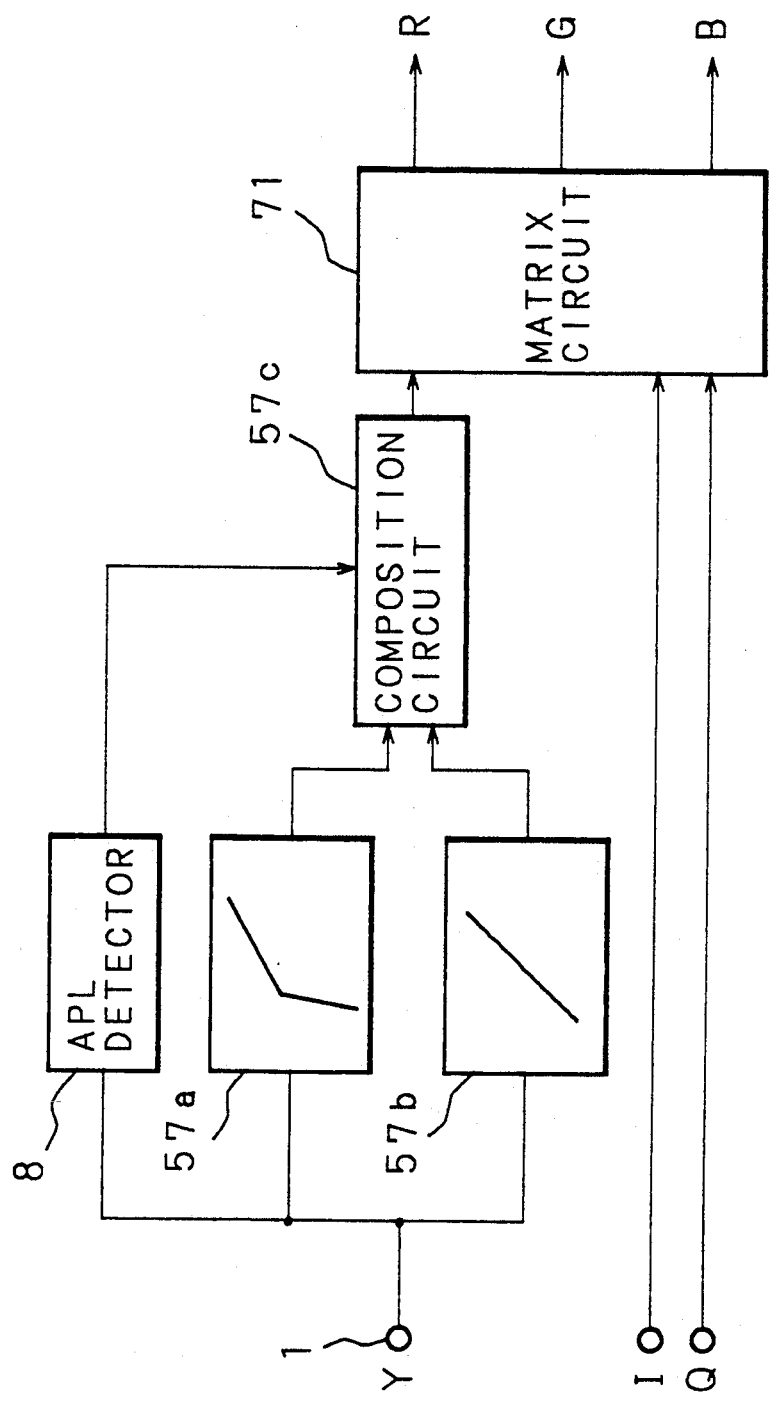
FIG. 14 is a circuit diagram illustrating a video signal process circuit according to a fifth embodiment of the invention.

FIG. 14 is a circuit diagram illustrating a video signal process circuit according to a fifth embodiment of the invention. A luminance signal Y inputted through an input terminal 1 is applied to first and second tone correction circuits 57a and 57b. The outputs from the first and second tone correction circuits 57a and 57b are composed in a composition circuit 70. The composition circuit 70 controls the composite ratio corresponding to the APL of the luminance signal Y detected by the APL detector 8. The output from the composition circuit 70 is applied together with I and Q signals to a matrix circuit 71 which demodulates these signals to R, G, and B primary signals.

Figure 1:
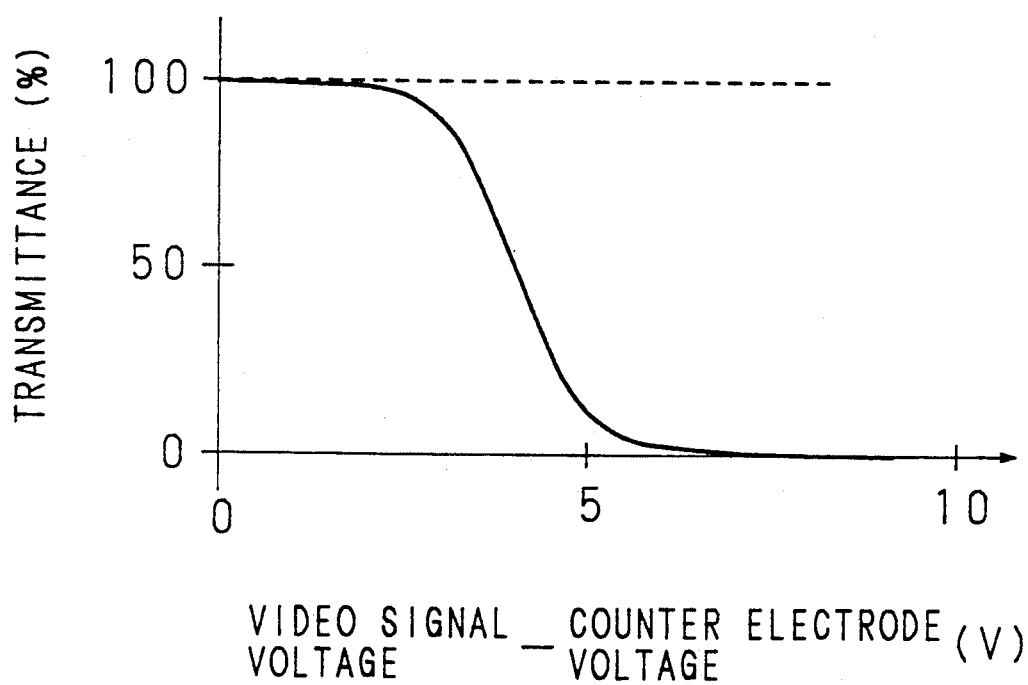
FIG. 1 is a graph showing the transmittance of an LCD panel against the voltage.
Figure 2:
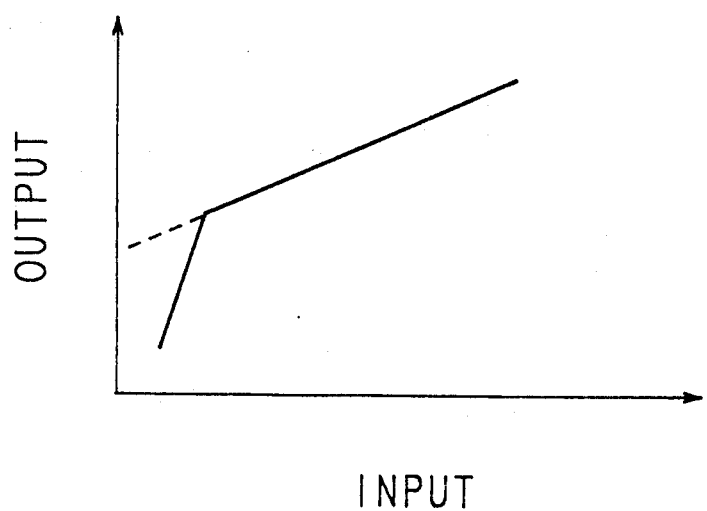
FIG. 2 is a graph showing the relationship between the input and output of a conventional video signal process circuit.
Figure 15:
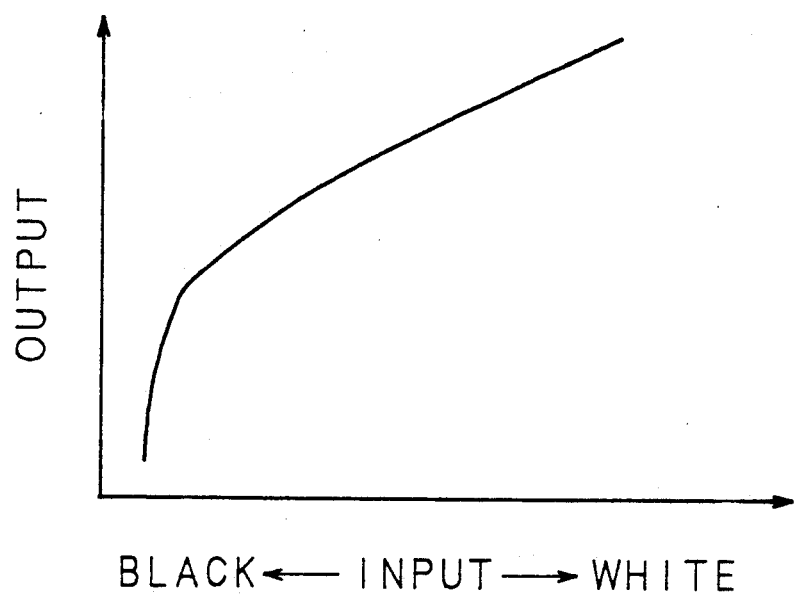
FIG. 15 is a graph showing the input-output characteristics of reverse γ correction.
Figure 16:
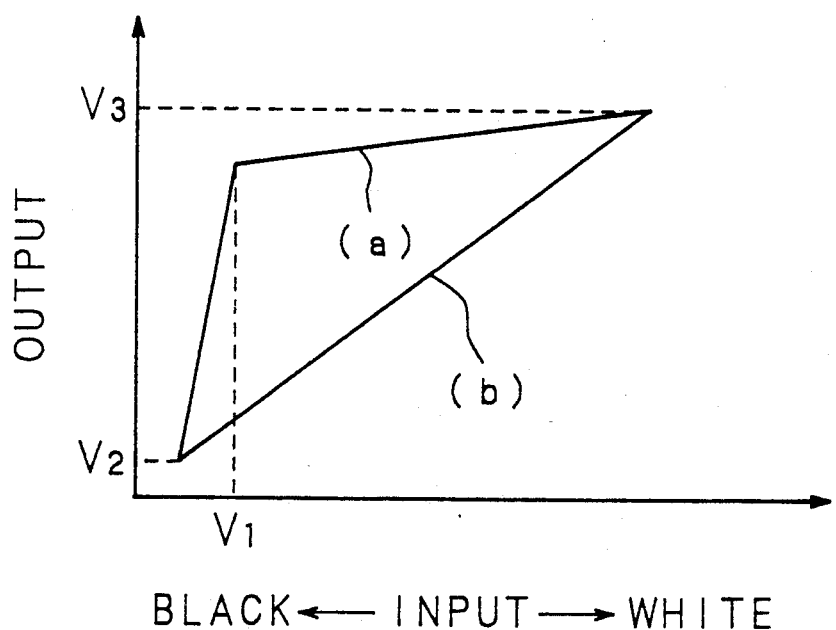
FIG. 16 is a graph showing the input-output characteristics in the fifth embodiment.

FIG. 15 is a graph showing characteristics of inverse γ correction; that is, tone correction to a video signal for obtaining good linearity in the transmittance-voltage characteristics of the LCD panel driven in normally-white mode as shown in FIG. 1. FIG. 16 is a graph showing input-output characteristics of a luminance signal processed by the circuit shown in FIG. 14. In FIG. 16, (a) denotes the input-output characteristics of the first correction circuit 57a, which is over-correction against the characteristics shown in FIG. 15; and (b) denotes the same of the second correction circuit 57b, which is linear. Here the output P-P values are the same for both the characteristics.

The composition circuit 70 is controlled to compose the outputs from the first and second tone correction circuits 57a and 57b in such a ratio that the input-output characteristics become close to the characteristics (a) when the AP detected by the APL detector 8 is relatively low and close to the characteristics (b) when the APL is relatively high.

Namely, when the APL is relatively low, black stretching is executed. On the other hand, when the APL is relatively high, though the characteristics are electrically linear, white stretching is executed based on the transmittance-voltage characteristics of the LCD panel as shown in FIG. 1.

Figure 17:
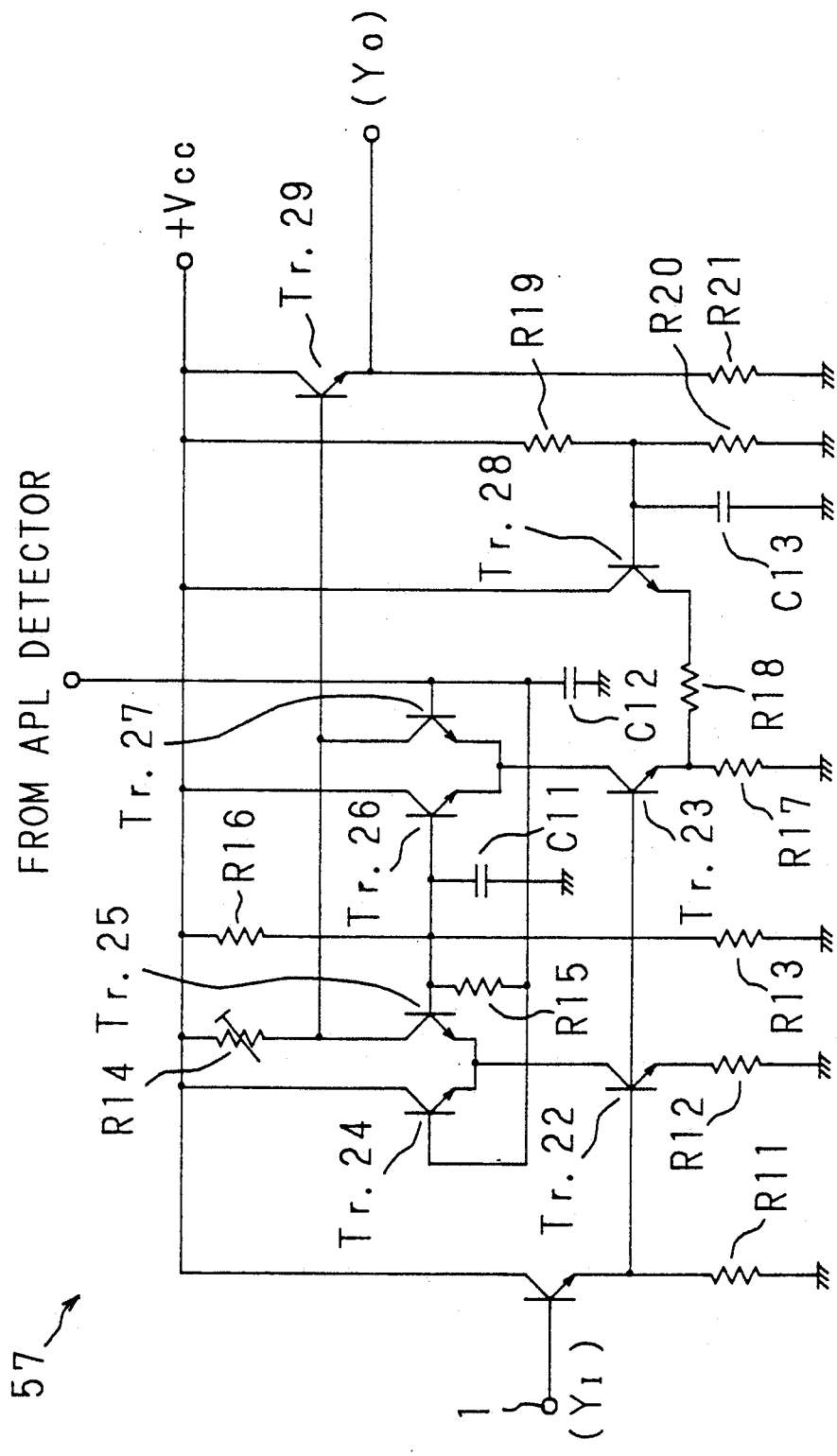
FIG. 17 is a detailed circuit diagram of a tone correction circuit of the fifth embodiment.

FIG. 17 is a detailed circuit diagram showing the first and second tone correction circuits 57a and 57b. A luminance signal $Y_I$ inputted through the input terminal 1 is applied to the base of transistors Tr.22 and Tr.23 via a buffer consisting of a transistor Tr.21 and resistance R11. A pair of transistors Tr.25 and Tr.26 and another pair Tr.24 and Tr.27 have common bases, respectively. A common loading resistance R14 is connected to the transistors Tr.25 and Tr.27.

When the control voltage applied by the APL detector 8 is sufficiently high, substantially all the current passing through the loading resistance R14 runs through Tr.27 to Tr.23 and scarcely runs to Tr.25. When the emitter voltage of Tr.23 is lower than that of Tr.28 base-biased by resistances R19 and R20, Tr.28 is turned ON and the emitter resistance of Tr.23 becomes equal to the composite resistance of resistances R17 and R18.

When the base bias of Tr.28 is adequately set, the gain of the emitter output $Y_O$ from Tr.29 varies corresponding to the level of the inputted video signal as shown in (a) of FIG. 16.

On the other hand, when the control signal from the APL detector 8 is sufficiently low, substantially all the current passing through the loading resistance R14 runs through Tr.25 to Tr.22 and scarcely runs to Tr.27. Here the input-output characteristics is linear as shown in (b) of FIG. 16.

The dynamic ranges (from $V_2$ to $V_3$) of (a) and (b) become identical to each other by setting an adequate value to the emitter resistance R12 of Tr.22.

When the control voltage from the APL detector 8 is close to that of the base bias of TR.25 and Tr.26, the output characteristics are between (a) and (b) of FIG. 16. Namely, the output characteristics are able to be continuously varied beteeen (a) and (b) by changing the control voltage.

Figure 18:
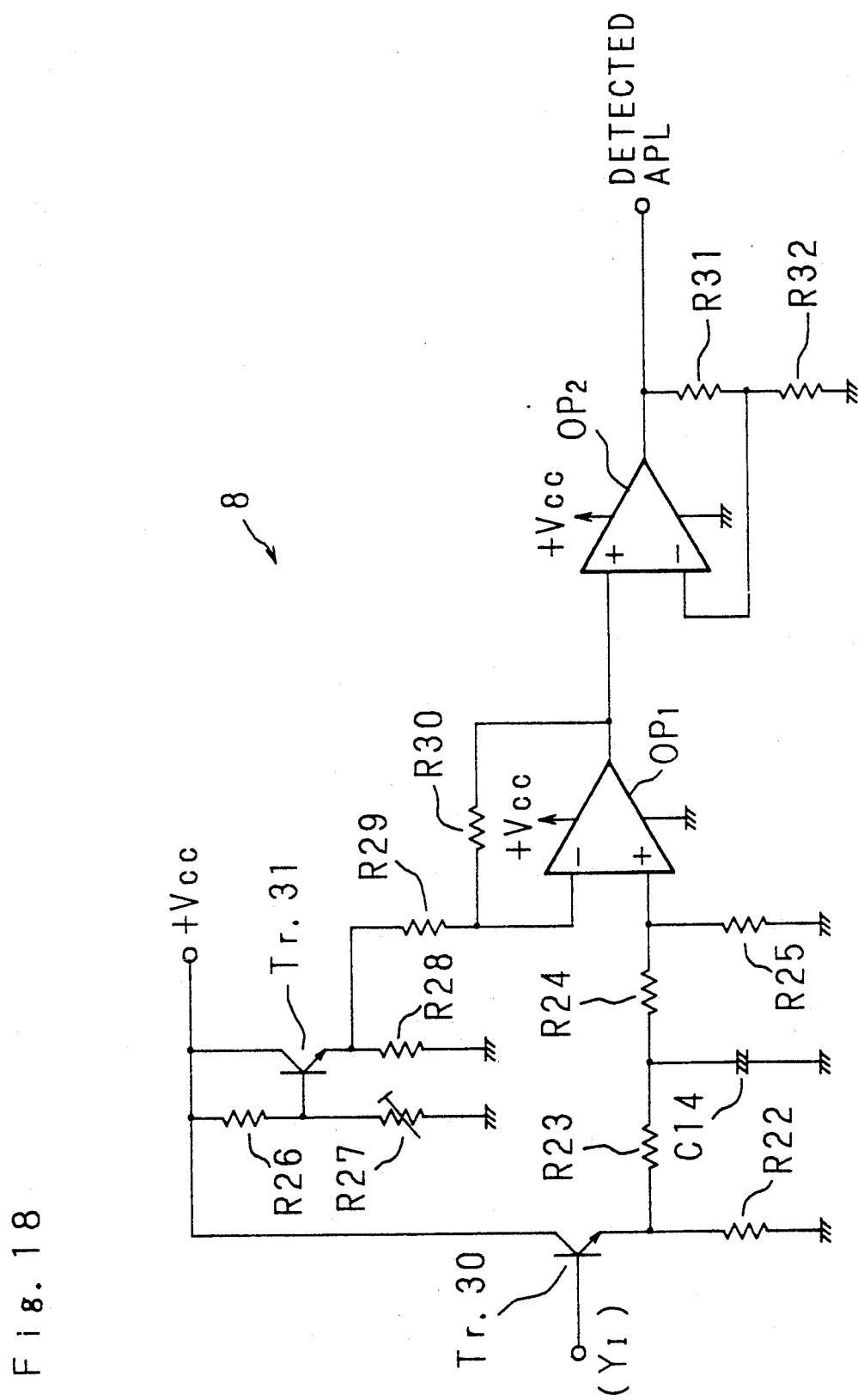
FIG. 18 is a detailed circuit diagram of an APL detector.

FIG. 18 is a detailed circuit diagram showing the APL detector 8. A signal Y inputted to the base of Tr.30 passes through a low-pass filter consisting of a resistance R23 and condenser C14 and is converted to a direct current corresponding to the APL. The signal level is then shifted and amplified by operational amplifiers OP1 an OP2 to be matched with the first and the second tone correction circuits 57a and 57b of FIG. 17.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. A video signal process circuit, including at least a luminance signal comprising:
    a black stretching circuit for stretching the black level of said video signal;
    a white stretching circuit for stretching the white level of said video signal;
    a circuit for detecting an average picture level of said video signal;
    control means for controlling stretching of the black and white level of said video signal by said black stretching circuit and white stretching circuit according to the average picture level of said video signal; and
    wherein said control means comprises:
        means for driving said white stretching circuit when said average picture level is higher than a first predetermined value;
        means for driving said black stretching circuit when said average picture level is lower than a second predetermined value; and
        means for driving both the while and black stretching circuits when said average picture level is between said first and second predetermined values.

2. A video signal process circuit, including at least a luminance signal comprising:
    a black stretching circuit for stretching the black level of said video signal;
    a white stretching circuit for stretching the white level of said video signal;
    a circuit for detecting an average picture level of said video signal;
    control means for controlling stretching of the black and white level of said video signal by said black stretching circuit and white stretching circuit according to the average picture level of said video signal; and
    further comprising:
        means for controlling the magnitude of a gain applied to said video signal so as to produce an output signal having an extended dynamic range, which applies a smaller gain when only the white or black level of said video signal is stretched according to said average picture level than when both the white level and the black level of said video signal is stretched according to said average picture level.

3. A video signal process circuit for processing a color video signal at least including a luminance signal, comprising:
    an input terminal for receiving said luminance signal;
    a detecting circuit connected to said input terminal, for detecting an average picture level of said luminance signal;
    a correcting circuit connected to said input terminal in parallel with said detecting circuit to receive said luminance signal and also connected to receive an output signal from said detecting circuit, for correcting the tone of said color video signal by stretching only the black level of said luminance signal in a first case where the detected average picture level is relatively low, by stretching only the white level of said luminance signal in a second case where said detected average picture level is relatively high, and by stretching both the black and white levels of said luminance signal in a third case where said detected average picture level is medium; and
    color gain control means receiving the output of said tone correction circuit, for applying a larger gain to said color video signal in said first case or said second case than in said third case.

* * * * *